United States Patent
Huijbers

(10) Patent No.: US 10,869,490 B2
(45) Date of Patent: Dec. 22, 2020

(54) METHOD OF AND PRESS FOR SEPARATING COCOA MASS INTO COCOA BUTTER AND COCOA CAKE

(71) Applicant: Royal Duyvis Wiener B.V., Koog aan de Zaan (NL)

(72) Inventor: Hans Huijbers, Alkmaar (NL)

(73) Assignee: Royal Duyvis Wiener B.V.

( * ) Notice: Subject to any disclaimer, the term of this patent is extended or adjusted under 35 U.S.C. 154(b) by 167 days.

(21) Appl. No.: 15/309,346

(22) PCT Filed: May 8, 2014

(86) PCT No.: PCT/EP2014/059473
§ 371 (c)(1),
(2) Date: Nov. 7, 2016

(87) PCT Pub. No.: WO2015/169377
PCT Pub. Date: Nov. 12, 2015

(65) Prior Publication Data
US 2017/0055543 A1    Mar. 2, 2017

(51) Int. Cl.
*A23G 1/08*    (2006.01)
*C11B 1/04*    (2006.01)
(Continued)

(52) U.S. Cl.
CPC ............. *A23G 1/08* (2013.01); *A23G 1/0023* (2013.01); *B30B 9/04* (2013.01); *B30B 9/045* (2013.01); *B30B 9/06* (2013.01)

(58) Field of Classification Search
CPC ........ A23G 1/0006; A23G 1/002; A23G 1/06; A23G 1/0023; A23G 1/04; A23G 1/08;
(Continued)

(56) References Cited

U.S. PATENT DOCUMENTS

2003/0161920 A1    8/2003   Mantel
2017/0071223 A1    3/2017   Huijbers

FOREIGN PATENT DOCUMENTS

CN    1524876 A    9/2004
DE      14990 C    1/1881
(Continued)

OTHER PUBLICATIONS

Japanese Notice of Reasons for Rejection; dated Mar. 19, 2018 for JP Application No. 2016-566891.
(Continued)

*Primary Examiner* — Hong T Yoo
(74) *Attorney, Agent, or Firm* — Mendelsohn Dunleavy, P.C.

(57) ABSTRACT

The invention relates to a method of separating cocoa mass into cocoa butter and cocoa cake by means of a press (1) comprising one or more pressing elements (6) in turn comprising a pot (7) having a cavity (8) for receiving cocoa mass to be pressed, a squeezer (9) located at least partially in the cavity (8), and at least one filter (11) disposed in front of the squeezer (9) and/or on the side of the cavity (8) opposite the squeezer (9), which method comprises the steps of filling the cavity or cavities (8) with cocoa mass, exerting pressure on the pressing element(s) (6) thus pressing cocoa butter through the filter(s) (11), releasing pressure from the pressing element(s) (6), and opening the pot(s) (7) to remove the cocoa cake(s) from the cavity or cavities (8). Prior to releasing the pressure from the pressing element(s) (6), cocoa butter is purged from at least the space(s) (13) behind the filter(s) (11).

20 Claims, 3 Drawing Sheets

(51) Int. Cl.
*A23G 1/00* (2006.01)
*B30B 9/04* (2006.01)
*B30B 9/06* (2006.01)

(58) Field of Classification Search
CPC ..... C11B 1/10; C11B 1/06; C11B 1/04; B30B 9/26; B30B 9/262; B30B 13/00; B30B 9/045; B30B 9/06; B01D 33/29; C02F 11/122
See application file for complete search history.

(56) References Cited

FOREIGN PATENT DOCUMENTS

| DE | 386035 | C | 12/1923 | | |
|---|---|---|---|---|---|
| DE | 723722 | C | 8/1942 | | |
| DE | 1109501 | B | 6/1961 | | |
| DE | 1145561 | B | 3/1963 | | |
| EP | 0318872 | A2 | 6/1989 | | |
| EP | 0634268 | A1 | 1/1995 | | |
| EP | 0945249 | A2 * | 9/1999 | ............. | B30B 9/045 |
| EP | 10421961 | A2 | 10/2000 | | |
| GB | 695605 | | 8/1953 | | |
| JP | 05023111 | A | 2/1993 | | |
| WO | WO9212853 | A1 | 8/1992 | | |
| WO | WO2015169964 | A1 | 11/2015 | | |

OTHER PUBLICATIONS

Singapore Written Opinion; dated Sep. 18, 2017 for Singapore Application No. SG11201609310T.
International Preliminary Report on Patentability; dated Aug. 17, 2016 for PCT Application No. PCT/EP2014/059473.
JP Decision of Rejection; dated Feb. 25, 2019 for JP Application No. 2016-566891.
Philippines Examination Report; dated Jan. 15, 2019 for PH Application No. 1/2016/502218.
Chinese Office Action; dated Mar. 18, 2019 for CN Application No. 201480079697.4.
"Notification of the Second Office Action" for corresponding Chinese Application No. 201480079697.4; dated Nov. 1, 2019 (8 pages).
Communication pursuant to Article 94(3) EPC for corresponding European application No. EP14721907.5; dated Apr. 9, 2020.
Examination Report for corresponding Indian application No. 201647041357; dated Oct. 27, 2020 (6 pages).

* cited by examiner

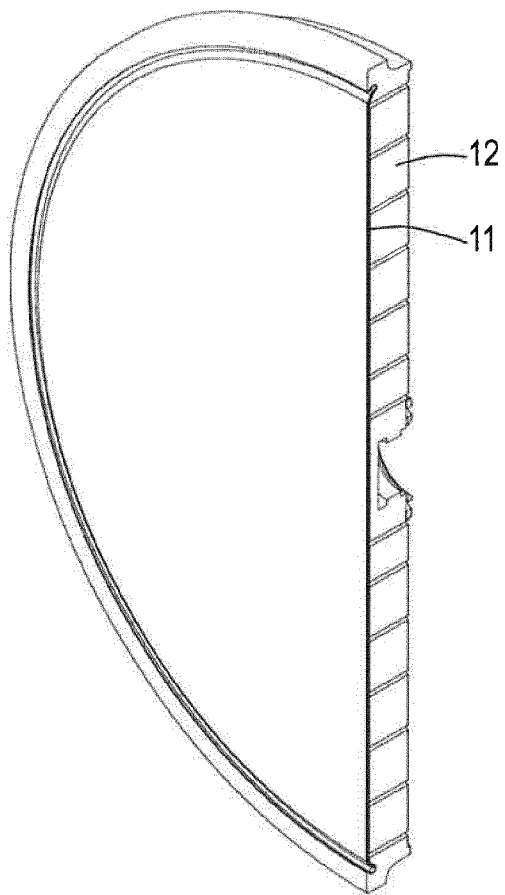
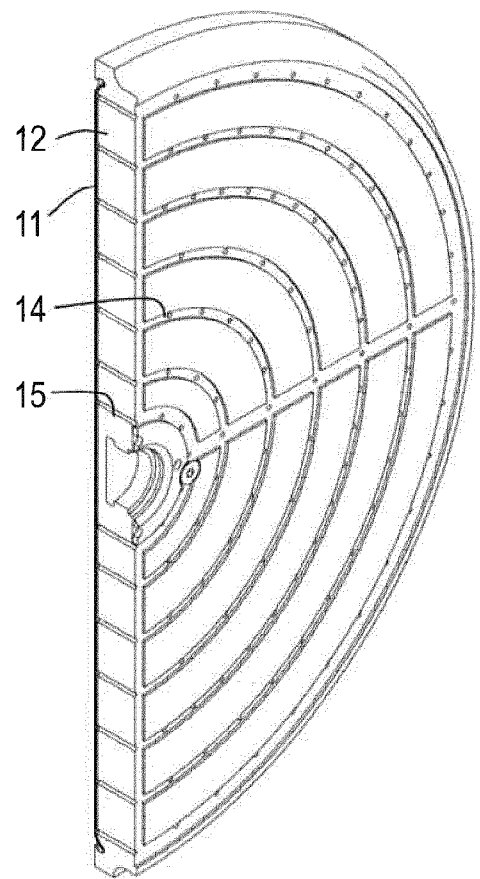
Fig.5A  Fig.5B
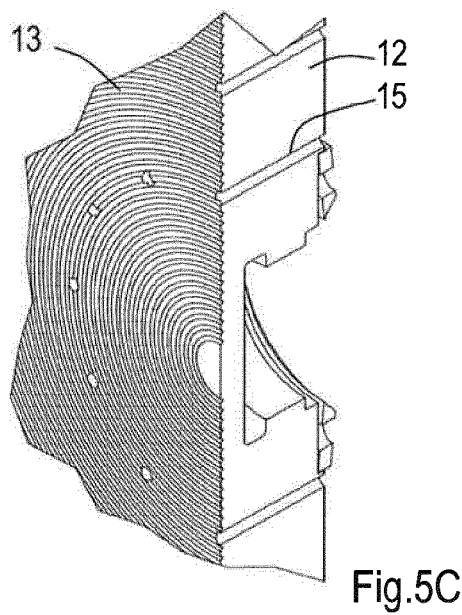
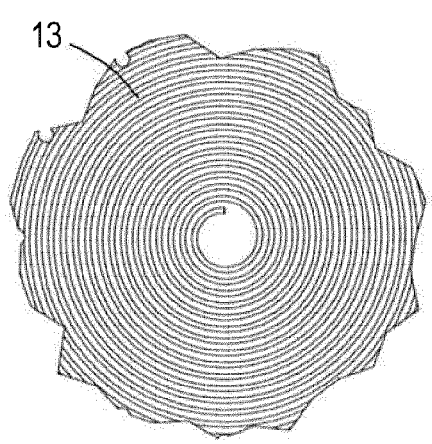
Fig.5C  Fig.5D

METHOD OF AND PRESS FOR SEPARATING COCOA MASS INTO COCOA BUTTER AND COCOA CAKE

The present invention relates to a method separating fat containing mass, e.g. cocoa mass, into liquid fat, e.g cocoa butter, and cake, by means of a press comprising one or more pressing elements in turn comprising a pot having a cavity for receiving cocoa mass to be pressed, a squeezer located at least partially in the cavity, and at least one filter disposed in front of the squeezer and/or on the side of the cavity opposite the squeezer, which method comprises the steps of filling the cavity or cavities with cocoa mass, exerting pressure on the pressing element(s) thus pressing liquid fat through the filter(s), releasing pressure from the pressing element(s), and opening the pot(s) to remove the cake(s) from the cavity or cavities. The invention further relates to a press for separating fat containing mass, e.g. cocoa mass, into liquid fat and cake.

A method and press of this kind are known, e.g. from EP 1 042 961.

A cocoa press generally comprises a hydraulic cylinder which is connected with a retainer by means of two parallel tie rods. Present in the cylinder is a plunger and between said plunger and the retainer are disposed a plurality of pressing elements. Each of the pressing elements comprises a so-called pot, which defines a (usually circle-cylindrical) cavity, and a squeezer, also known as counter pot or male pot, and typically two filters, one on each side (seen in axial direction) of the cavity.

During a cycle, the pressing elements are filled with cocoa mass via supply lines (inlets) and the cocoa mass is subsequently compressed. As a result, the cocoa butter is pressed through the filters and discharged. When a sufficient or pre-selected amount of butter has been pressed from the cocoa mass, the pressure is released and the press is returned to its starting position. At that position, the pots are pushed (or pulled) over the squeezers, and the cocoa cakes fall out. Finally, the pots are returned to the starting position and the cycle is complete.

WO 92/12853 addresses the problem of increasing the productivity of a squeezer for squeezing oil-containing materials, particularly a mass of cocoa, without increasing the number or diameter of the squeezing chambers. To this end, the filtering elements placed on the chamber walls have a non-planar shape having an increased area, e.g. hemispherical, tapered or "serpentine". In the passage bridging pages 5 and 6 of WO 92/12853, a cycle is described wherein a vacuum is applied to the outlets (denoted by numerals 25 and 26 in FIG. 1 of WO 92/12853) to accelerate the passage of liquid through the filters (23, 24). As the pressing of cocoa mass is performed at high specific pressures, e.g. 900 bar, the contribution of a vacuum (i.e., the addition of at most 1 bar pressure difference over the filters) is relatively small.

DE-A-1 109 501 discloses a cocoa press comprising an inlet (8) for cocoa mass and an outlet (11) for cocoa butter. The filling height of the pot (Preßtopf) is preferably about 20 mm and should not exceed 30 mm.

EP-A-0 634 268 is directed to a male pot for cacao and oil seed presses. The pot comprises two ring/disc elements (numeral 4 in FIGS. 1-5) provided with a plurality of holes (5) connected with corresponding channels (6) in turn connected with a draining channel (7) "for draining therefrom liquid material which can comprise cocoa butter or an oil material".

DE-C-723 722 concerns a cocoa press wherein the cocoa mass is still liquid after pressing.

DE-C-14 990 concerns a cocoa press comprising a plurality of pressing elements (Kasten) each provided with a single filter means.

EP-A-0 318 872 concerns a device for the separation of gaseous and/or liquid matter from bulk goods with the effect of pressure on a charge of the goods enclosed in at least one press chamber and compaction to the solid mass of a press-cake.

Various cocoa presses have been made available by companies such as Duyvis, Nagema/Heidenau, Carle Montanari, and Bauermeister.

It is an object of the present invention to increase the amount of liquid fat produced during individual cycles and/or reduce cycle duration.

To this end, the method according to the invention is characterised in that, prior to releasing the pressure from the pressing element(s), liquid fat is purged from at least the space(s) behind the filter(s), and preferably also from the filter(s).

It was found that in this manner more liquid fat can be produced per cycle and/or the duration of the cycle can be reduced, e.g. depending on where priority lies.

It is preferred that liquid fat is purged by means of a flowable medium that is preferably immiscible with liquid fat. Although liquid fat can be purged by means of a liquid, such as water, it is preferred that the liquid fat is purged by means of a gas, such as air or nitrogen.

Also, to overcome e.g. capillary forces or adhesion of the liquid fat to the filters, filter plates, discharge lines and the like, it is preferred that, during purging, a pressurized medium is fed to the space(s) behind the filter(s) and/or the medium and the liquid fat are withdrawn from said space(s). The pressure and flow rate of the purge medium can be adjusted to the degree of the capillary forces and/or adhesion, e.g. if said forces and/or adhesion is relatively strong the pressure and flow rate can be increased.

In an embodiment, a flow of the pressurized medium is generated in the space(s) behind the filter(s), preferably with a pressure difference between inlet and outlet of at least 0.2 bar, preferably at least 0.4 bar. Pressure drop results in a pressure gradient in the space(s) behind the filter(s) and thus in the liquid fat in the filter(s), which in turn causes transport of liquid fat through the filter(s) in a direction from the inlet(s) of the purge medium to the outlets of the purge medium. Pressure drop and thus gradient can be increased e.g. by means of flow restrictions in the space(s) behind the filter(s).

The invention further relates to a press for separating cocoa mass into liquid fat and cake, wherein at least one, preferably all of the pressing elements is respectively are provided with an inlet, e.g. a vent or pressure line, for a flowable medium for purging liquid fat from at least the space behind the at least one filter.

To facilitate the purging of liquid fat, it is preferred that said outlets for butter are connected to a low pressure source, preferably a vacuum pump, and/or said inlets are connected to a source of the purge medium, which source comprises a pump and/or is at an elevated pressure.

In an embodiment, the inlet(s) for a medium for purging liquid fat is (are) provided in the squeezer(s). In a further embodiment, the inlet(s) and the outlet(s) are positioned substantially diametrically, i.e., diametrically opposed or within 30 degrees of the same diameter, and preferably both in the squeezer.

It is preferred that the press comprises means, e.g. a controller such as a computer, arranged for operating the press to perform the method described above.

In general, it is preferred that the cavities are cylindrical, said filters are flat or substantially flat and/or the side of the cavity opposite the squeezers is formed by the back of an adjoining squeezer.

The effect of the present invention is more pronounced when cakes are thinner. Thus, it is preferred that the distance between the filters is smaller than 85 mm, preferably smaller than 75 mm, preferably smaller than 65 mm, preferably in a range from 60 to 30 mm, preferably smaller than 60 mm and larger than 30 mm.

The invention will now be explained in more detail with reference to the drawings, which show an example of a hydraulic cocoa press according to the invention.

FIGS. 5A to 5D are various views of a filter and filter plate used in the press according to FIG. 1.

Figure 1:
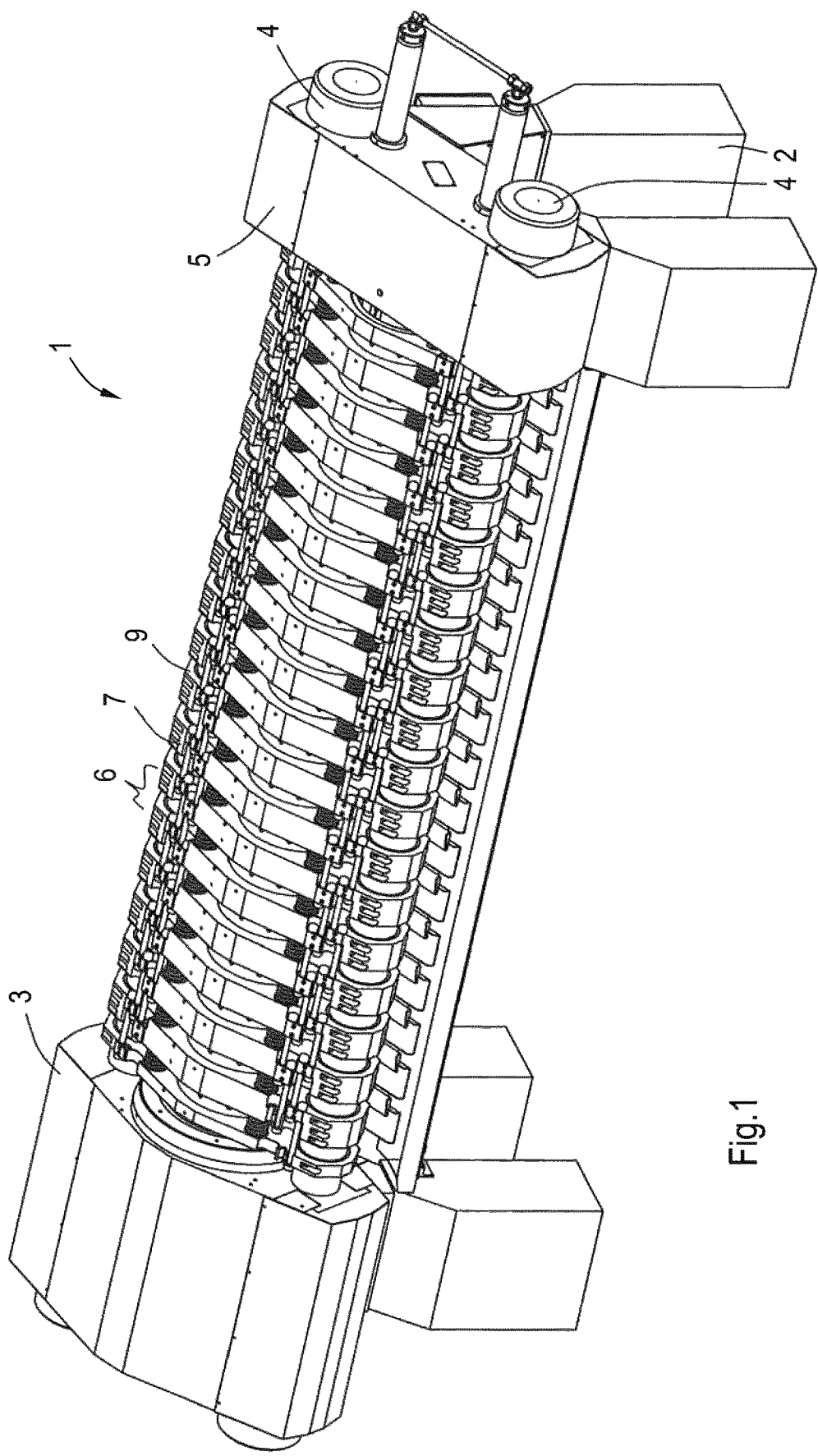
FIG. 1 is a perspective view of a hydraulic cocoa press according to the invention.

FIG. 1 shows a hydraulic cocoa press 1 comprising a frame 2 and a hydraulic cylinder 3, two tie rods 4, and a retainer 5 mounted in the frame 2. A number of pressing elements 6, e.g. sixteen, eighteen or twenty, is located between the cylinder 3 and the retainer 5.

Figure 2:
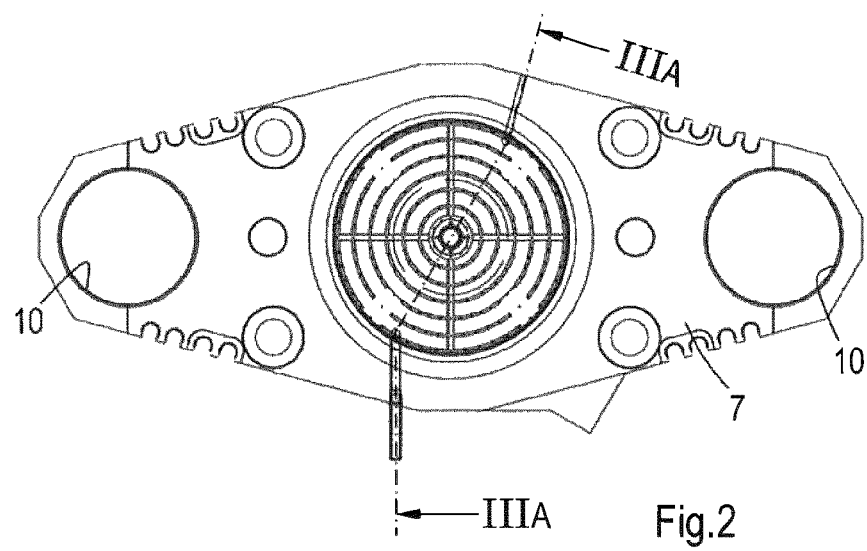
FIG. 2 is a front view of a pressing element of the press according to FIG. 1.
Figure 3B:
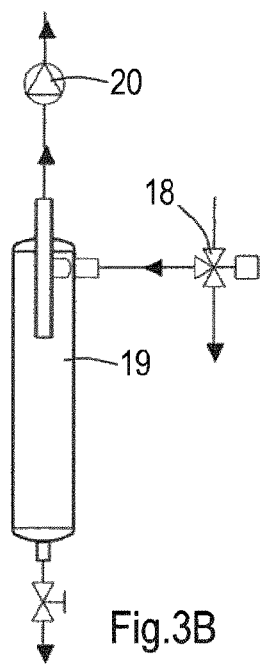
FIG. 3B is a cross-sectional view of a gas/liquid separator and pump connected to the outlets of the pressing elements of the press of FIG. 1.
Figure 3A:
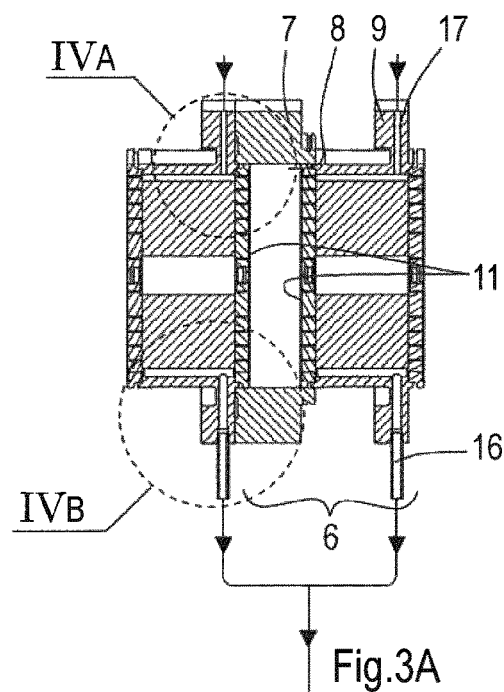
FIG. 3A is a cross-sectional view of a pressing element of the press of FIG. 1, in the filling position.

Each of the pressing elements 6, shown in more detail in FIGS. 2 and 3A, comprises a pot 7 having a cylindrical cavity 8 for receiving cocoa mass to be pressed, and a squeezer 9, also known as counter pot or male pot, sealingly positioned in the cavity 8. The pots 7 as well as the squeezers 9 are slidingly mounted round the tie rods 4 by means of circular openings 10, which are formed in the side portions of the pots 7 and the squeezers 9.

The cavity 8 is limited on both sides (in axial direction) by a disc-shaped filter 11, e.g. a filter cloth or metal mesh known in itself, mounted on a filter plate 12, as shown in FIG. 5A.

The front side of the filter plate 12, i.e. the side facing the cavity 8 of a pot 7, comprises at least one groove 13, in this example in the shape of a spiral (FIGS. 5C and 5D), for collecting cocoa butter pressed through the filter 11. The back side of the filter plate 12 (FIG. 5B) comprises at least one channel 14, in this example a plurality of concentric channels interconnected by a plurality of radial channels, for guiding the cocoa butter to an outlet of the pressing element 6, which at least one channel 14 is connected to the channel 13 on the front side of the filter plate 12 by means of a plurality of bores 15 extending through the plate 12.

One filter plate is attached to the squeezer, whereas the other filter plate is attached to the back of a squeezer which forms part of an adjoining pressing element.

Figure 4B:
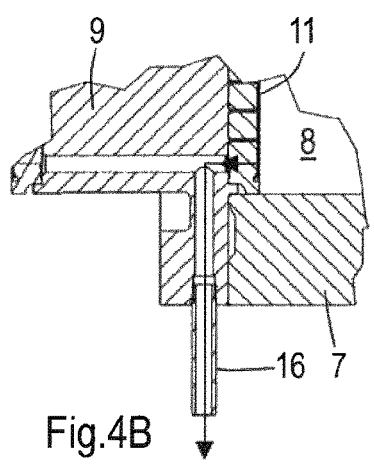
FIGS. 4A and 4B are enlargements of parts of FIG. 3A showing the inlet and outlet of the pressing element.
Figure 4A:
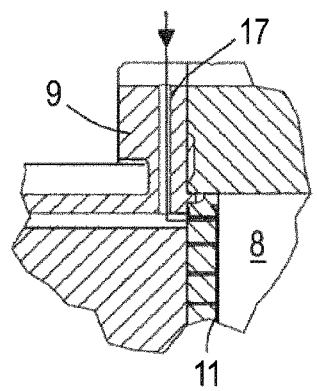

The pots include inlets (not shown; known per se) for the cocoa mass, whilst the squeezers 9 include outlets 16, shown enlarged in FIG. 4B, for discharging cocoa butter that has been pressed through the filters 11. In accordance with the present invention, all of the squeezers 9 are in addition provided with an inlet 17, shown enlarged in FIG. 4A, for a medium for purging cocoa butter from at least the space behind the filters, typically at least from the channel(s) on the front side of the plate. This inlet may, e.g., be comprised of a vent or be connected to a source of the purge medium, which source comprises a pump and/or is at an elevated pressure.

The outlets 16 of the squeezers 9 are connected, via a three-way valve 18 and a gas/liquid separator 19 for separating the purge gas from the cocoa butter, to a vacuum source, in this example a vacuum pump 20.

FIGS. 1 and 3A show the press 1 in the filling position. In this position, the plunger of the hydraulic cylinder 3 occupies (in FIG. 1) its extreme left-hand position, and the spacing between the disc-shaped filters 11, and thus the volume of cavity 8 in each of the pressing elements 6, is at its maximum. In this example, the spacing between the filters 11 that are present in each of the pressing elements 6 is 65 mm in the filling position.

During operation, the cavities of the cocoa press are filled with cocoa mass and, once filled, the pressing elements are compressed evenly by moving the plunger of the hydraulic cylinder towards the retainer until the pressure reaches a specific threshold value, e.g. 500 bar. When a sufficient amount of butter has been pressed from the cocoa mass, the cocoa butter in the channel(s) on the front side of the filter plates and downstream from the filters is purged. In this example, purging is achieved by means of the vacuum pump and the vents that allow air to enter the squeezers and flush out the butter. When all or most of the butter has been purged from behind the filter—thus hydraulically separating the butter from the resiliently compressed cocoa cakes—and optionally from the filters and filter plates, i.e. from the bores in and from the channel(s) on the back of the filter plate, the pressure is released and the press is returned to its starting position. At that position, the pots are pushed (or pulled) over the squeezers, and the cocoa cakes fall out. Finally, the pots are returned to the starting position and the cycle is complete.

In several experiments, the cakes contained, if the butter was purged from behind the filters before releasing pressure, approximately 5-10% less fat when compared to cakes obtained with cycles wherein no butter was purged.

From the foregoing, it will be apparent that the invention offers significant advantages over prior art presses whilst the measures to be taken can be relatively simple. Existing presses can be made suitable for the present invention by providing at least one, preferably all of the pressing elements with an inlet for a medium for purging cocoa butter from at least the space behind the at least one filter or exchanging at least one, preferably all of the pressing elements with a pressing element comprising such an inlet.

The invention is not limited to the embodiment as described above, which can be varied in several ways within the scope of the claims, of course. Thus, the press can also be used for products of which the pressing and filtration behaviour is comparable to that of cocoa mass.

The invention claimed is:

1. A method of separating cocoa mass or products comparable to cocoa mass into liquid fat and cake, by means of a press comprising one or more pressing elements, each said pressing element: in turn comprising a pot having a cavity for receiving the cocoa mass or the products comparable to cocoa mass to be pressed, a squeezer located at least partially in the cavity, and at least one filter disposed in front of the squeezer and/or on a side of the cavity opposite the squeezer, which method comprises steps of filling the one or more cavities with the cocoa mass or the product comparable to cocoa mass, exerting pressure on the one or more pressing elements thus pressing liquid fat through the one or more filters from the one or more cavities in front of the one or more filters to one or more spaces behind the one or more filters, releasing pressure from the one or more pressing elements, and opening the one or more pots to remove one or more cakes from the one or more cavities, characterised in that, prior to the step of releasing the pressure from the one or more pressing elements, liquid fat is purged from at least one of said one or more spaces behind the one or more filters.

2. The method according to claim 1, wherein, prior to the step of releasing the pressure from the one or more pressing elements, liquid fat is purged from the one or more filters.

3. The method according claim 1, wherein the liquid fat is purged by means of a flowable medium.

4. The method according to claim 3, wherein, during said purging, a pressurized medium is fed to the one or more spaces behind the one or more filters and/or the pressurized medium and the liquid fat are withdrawn from said one or more spaces.

5. The method according to claim 4, wherein a flow of the pressurized medium is generated in the one or more spaces behind the one or more filters.

6. The method according to claim 5, wherein the flow of the pressurized medium is generated with a pressure difference between an inlet and an outlet of at least 0.2 bar.

7. The method according to claim 5, wherein the flow of the pressurized medium is generated with a pressure difference between an inlet and an outlet of at least 0.4 bar.

8. The method according to claim 3, wherein the flowable medium is air or nitrogen.

9. A press for separating cocoa mass or products comparable to cocoa mass into liquid fat and cake, said press comprising a frame, one or more pressing elements disposed in the frame, and means for exerting pressure on the one or more pressing elements, wherein each of the one or more pressing elements comprises a pot having a cavity for receiving the cocoa mass or the product comparable to cocoa mass to be pressed, a squeezer located at least partially in the cavity, one or more filters disposed in front of the squeezer and/or on a side of the cavity opposite the squeezer said one or more pressing elements being configured to press the cocoa or the product comparable to cocoa mass from the one or more cavities in front of the one or more filters to one or more spaces behind the one or more filters by exertion of pressure on said one or more pressing elements, and an outlet for liquid fat, characterised in that at least one of the one or more pressing elements is provided with an inlet for a flowable medium for purging liquid fat from at least one of the one or more spaces behind the one or more filters and the press is configured to purge said liquid fat from the at least one of the one or more spaces behind the one or more filters prior to releasing the pressure exerted on said one or more pressing elements.

10. The press according to claim 9, wherein said one or more inlets are connected to a source of the medium, which source comprises a pump and/or is at an elevated pressure.

11. The press according to claim 9, wherein said one or more outlets for liquid fat are connected to a low pressure source.

12. The press according to claim 11, wherein the low pressure source is a vacuum pump.

13. The press according to claim 9, wherein the one or more inlets for a medium for purging liquid fat are provided in the one or more squeezers.

14. The press according to claim 9, wherein the one or more inlets and the one or more outlets are positioned substantially diametrically.

15. The press according to claim 9, wherein at least one of the one or more squeezers comprises at least one channel for collecting liquid fat pressed through the respective one or more filters.

16. The press according to claim 9, further comprising means configured for operating the press to perform the method of claim 1.

17. The press according to claim 9, wherein in at least one of the one or more pressing elements, said press includes two or more of said filters, said one or more filters are disposed in front of the one or more squeezers and on the side of the one or more cavities opposite the one or more squeezers and when the press is in a filling position, a distance between the two or more filters is smaller than 85 mm.

18. The press according to claim 17, wherein the distance between the two or more filters is smaller than 60 mm and larger than 30 mm.

19. The press according to claim 9, wherein all of the one or more pressing elements are provided with an inlet for a flowable medium for purging liquid fat from all of the one or more spaces behind the one or more filters.

20. The press according to claim 9, wherein
said one or more inlets are connected to a source of the medium, which source comprises a pump and/or is at an elevated pressure,
said one or more outlets for liquid fat are connected to a vacuum pump,
the one or more inlets for a medium for purging liquid fat are provided in the one or more squeezers,
the one or more inlets and the one or more outlets are positioned substantially diametrically,
at least one of the one or more squeezers comprises at least one channel for collecting liquid fat pressed through the respective one or more filters,
the one or more cavities are cylindrical, said one or more filters are flat or substantially flat and/or wherein the side of the one or more cavities opposite said one or more squeezers is formed by a back of an adjoining one of said one or more squeezers,
the press comprises two or more filters,
said press further comprising means configured for operating the press to perform the method of claim 1, and
in the one or more pressing elements, said one or more filters are disposed in front of the one or more squeezers and on the side of the one or more cavities opposite the one or more squeezers and when the press is in a filling position, a distance between the two or more filters is smaller than 60 mm and larger than 30 mm.

\* \* \* \* \*